United States Patent [19]

Rüter

[11] Patent Number: 4,530,614
[45] Date of Patent: Jul. 23, 1985

[54] FRAMEWORK MADE OF HOLLOW SECTIONS

[76] Inventor: Ewald Rüter, Bittermarkstr. 70, 4600 Dortmund 50, Fed. Rep. of Germany

[21] Appl. No.: 488,549
[22] PCT Filed: Jul. 6, 1982
[86] PCT No.: PCT/DE82/00139
 § 371 Date: Mar. 10, 1983
 § 102(e) Date: Mar. 10, 1983
[87] PCT Pub. No.: WO83/00175
 PCT Pub. Date: Jan. 20, 1983

[30] Foreign Application Priority Data

Jul. 10, 1981 [DE] Fed. Rep. of Germany ....... 3127243

[51] Int. Cl.³ ............................................. F16B 17/00
[52] U.S. Cl. .......................................... 403/7; 403/12; 403/14
[58] Field of Search ................... 403/7, 8, 6, 343, 21, 403/12, 339, 340, 10, 19, 14; 41/337, 347, 352

[56] References Cited

U.S. PATENT DOCUMENTS

| 3,198,562 | 8/1965 | Smith | 403/7 |
| 3,675,312 | 7/1972 | Herman | 403/8 X |
| 4,044,511 | 8/1977 | Lingle | 403/8 X |
| 4,082,470 | 4/1978 | Alberts | 403/7 X |
| 4,092,904 | 6/1978 | Schreiber | 403/343 X |
| 4,190,375 | 2/1980 | Berry | 403/7 |
| 4,249,830 | 2/1981 | Day | 403/7 |

FOREIGN PATENT DOCUMENTS

| 1815849 | 12/1968 | Fed. Rep. of Germany . |
| 2819632 | 11/1979 | Fed. Rep. of Germany . |
| 2200420 | 4/1974 | France . |
| 44875 | 4/1966 | German Democratic Rep. . |

Primary Examiner—Dave W. Arola
Attorney, Agent, or Firm—Karl F. Ross; Herbert Dubno

[57] ABSTRACT

In order to obtain a high initial stress force of the screw, in particular cap screw, in a framework made of hollow sections used as bar elements, joined at separate junction members, having connecting parts for the bar elements, whereby threaded holes are provided at the exposed ends of the connecting parts and plates with central bores are provided at the end of the bar elements, on each of the plates a cap screw with its head positioned within the bar element being inserted and screwable into the threaded bore on the side of the connecting part, whereby finally the bar elements, the plates and the connecting parts reach a smooth exterior profiling, achieving a framework free of recesses and projections it is proposed that a tubular guiding piece (6) be supported by the plate (4) inside the bar element (2) forming a sliding duct for the cap screw (7) and running slightly curved with respect to the wall of the corresponding bar element (2) and abutting in an opening (8) for the passage of the screw provided in the wall of the bar element (2).

8 Claims, 5 Drawing Figures

U.S. Patent Jul. 23, 1985 Sheet 1 of 2 4,530,614
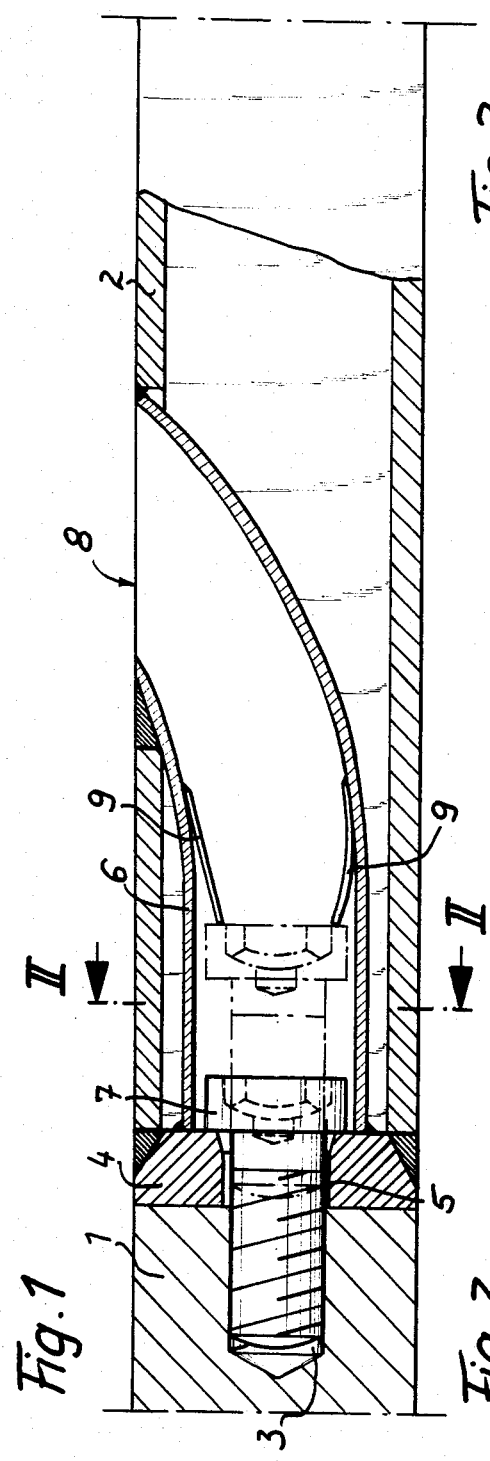
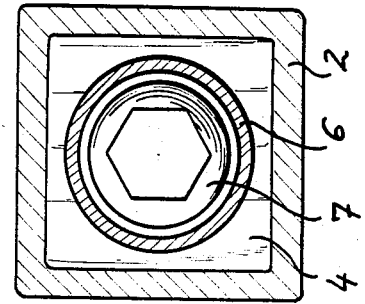
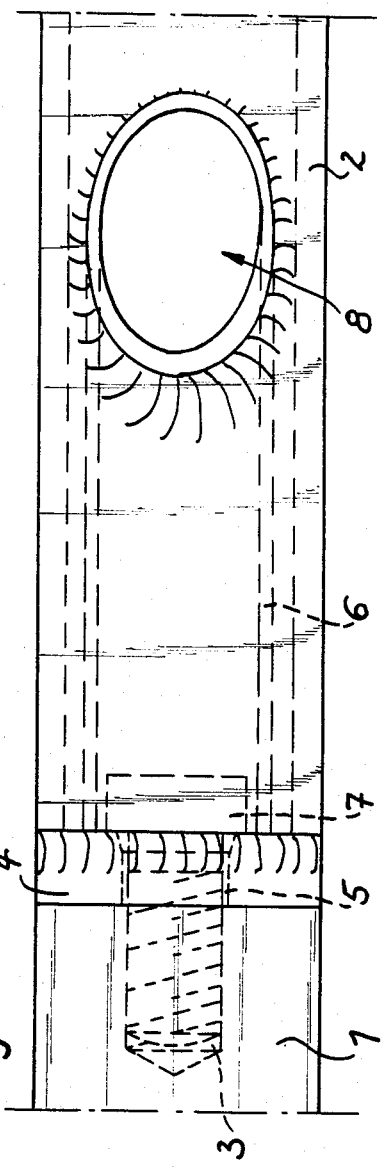

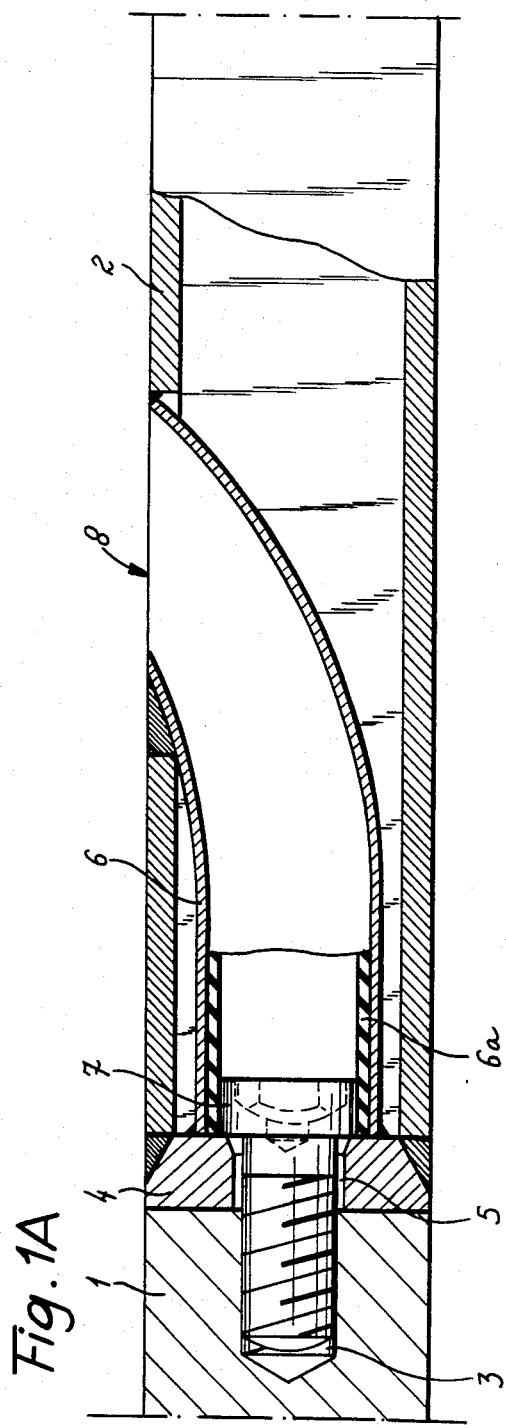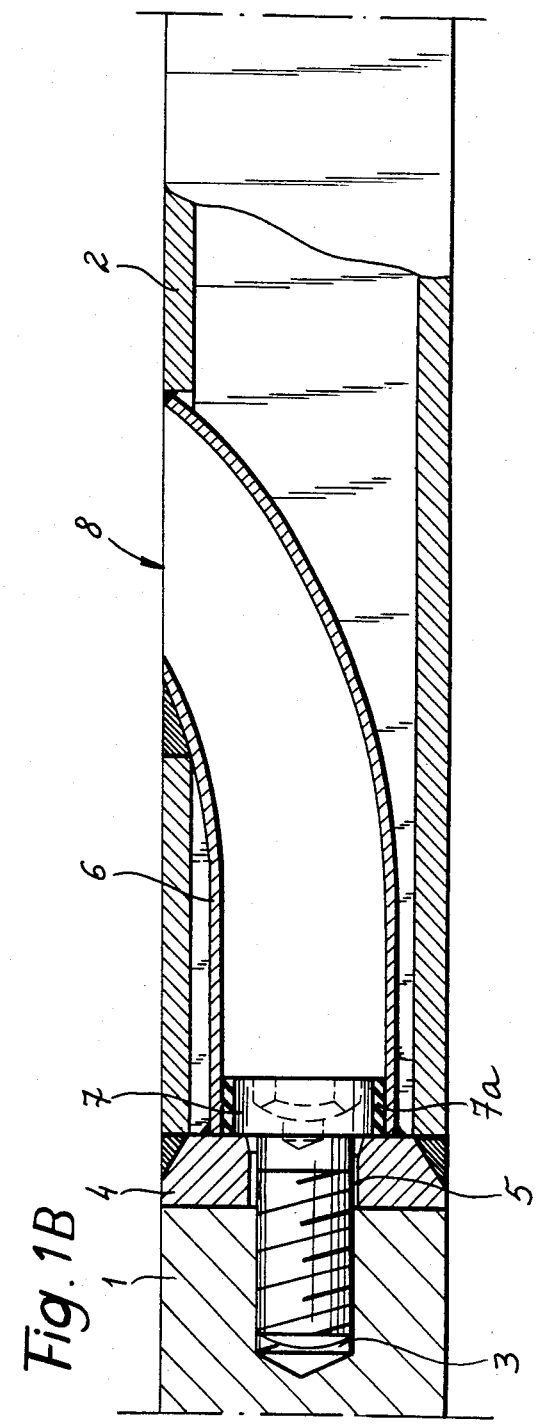

FRAMEWORK MADE OF HOLLOW SECTIONS

FIELD OF THE INVENTION

The invention relates to a framework having hollow sections as bar elements which are joined at separate junction members.

BACKGROUND OF THE INVENTION

Frameworks whereby the junction members have several connecting pieces for the uniform bar elements are known, e.g. from German Printed Specification No. 28 19 632, said connecting pieces forming three-dimensional or plane angles. In the open ends of the connecting pieces threaded holes are provided, centrally punched plates are mounted at the end of the bar element, and a cap screw is inserted in each punched plate with its head positioned inside the bar element. The screw is screwable into the threaded holes on the side of the connecting piece. Finally the bar elements, the plates and the connecting pieces have a smooth exterior profiling in order to yield a framework free of recesses and projections.

In the case of the German reference a cap screw with a polygonal shank portion is provided, over which a coupling piece in the shape of a plate, cooperating with the polygonal shank portion is slipped. This coupling piece can be acted upon from the outside by means of a wrench or the like, permitting the tightening of the screw.

However, in this embodiment one cannot apply sufficient tightening force to the screw, since it is not possible to apply a large enough lever arm for the actuation of the coupling part.

OBJECT OF THE INVENTION

The object of the present invention is to provide an improved three-dimensional framework whereby a higher tightening force can be applied to the screw through the use of a common screwdriver and cap screws commonly found on the market, the additional coupling part being eliminated all together.

SUMMARY OF THE INVENTION

This object is attained according to the invention with a tubular guiding piece supported inside of the bar element, forming a sliding duct for the head of the screw running inside of the bar element and slightly curved with respect to the wall of the corresponding bar element, said pipe ending in an opening for the passage of the screw in the wall of the bar element.

Through a combination of these features, it is possible to introduce high-stress screws, commonly available on the market, into the tubular guiding piece and into the corresponding hole, in order to join the connecting piece and the bar element. The screw is then firmly tightened by means of a common impact screwdriver whereby the shank of a knuckle joint adapted to the tubular guiding piece is slipped on the impact screwdriver. In this manner sufficient initial torque can be transmitted, since the screw can be tightened mechanically. The high-strength screw tightened under high force is secured without additional securing parts.

In order to offset the weakening of the bar elements as a result of the existence of the screw-passage opening in the wall, it is proposed to connect the guiding piece at its outlet side with the wall surrounding rim of the screw-passage opening of the bar element. The connection is carried out advantageously through welding. For installation purposes, it is advantageous that the inner and outer cross-section of the guiding piece be round.

It is especially advantageous that the clear inside diameter of the guiding part be only slightly larger than the outside diameter of the head of the cap screw and that the cap screw be of the polygonal socket-screw type.

This way it is possible to insert relatively large cap screws with respect to the available inside section and to drive them by a corresponding tool.

It has proven particularly advantageous for fabrication to attach the guiding piece to the back of the plate and to connect the plate to the rim of the open end of the bar element.

For this purpose, the guiding piece is welded advantageously to the back of the plate and the plate is then welded to the rim of the open end of the bar element.

This construction makes it possible to final-weld the complete bar element including the necessary guiding pieces and to hot-galvanize this complete part thereafter. After the hot galvanizing no further welding is necessary. Thereby, the screw can be introduced for assembling only after completion of the galvanization. It is also possible to coat the completed bar element with synthetic material.

In the aforementioned state of the art it was required that the bar element be first galvanized by dipping, then the screw and the pertaining plate had to be introduced in the frontal opening and the plate had to be welded to the bar element, thereafter a cold galvanization had to be performed in the welding area.

This quite complicated procedure was required by the fact that the screw was already in place due to the positioning of the plate, but was not to be subjected to hot galvanization at the same time. A synthetic-material coating was practically impossible for the same reasons or had to be carried out with considerable effort.

It has also to be pointed out that the construction according to the invention is independent of the cross section of the bar elements and of the connecting elements. Circular, square or polygonal cross-sections can be used. The connecting piece can be a welded construction made of individual sections or also a corresponding casting.

It is essential that when a screw commonly found on the market is used a fully projection-free transition between the connecting piece and the bar element be created, so that both pieces give an impression of complete uniformity to the eye. A tight seal of the interior of the bar element can be achieved so that the bar elements are not exposed to corrosion from the inside.

In order to prevent the screws from falling down, for instance in the case of overhead mounting, the screw head of the cap screw is provided radially on the outside with an elastic sleeve which is pressed against the inside of the guiding piece.

After the insertion of the cap screw provided with a sleeve, the rim of the sleeve is pressed against the inside of the guiding piece, whereby sufficient friction forces to hold the cap screw are developed. These friction forces do not oppose the actuation of the cap screw.

Alternately or in combination, for the same purpose the guiding piece is provided with an elastic sleeve extending inside from the plate for a distance corresponding to the length of the screw.

Further in an alternate construction the guiding piece has a spring cage ending at a distance corresponding to the length of the screw, starting from the plate.

The spring cage can be attached to the inner wall of the guiding piece. Said spring cage allows the insertion of the cap screw, whereby the spring brackets of the spring cage are pushed radially outwards, but after the passage of the screw head spring back inwardly creating a blockage for the cap screw, thus preventing the screw from falling out from the guiding piece.

BRIEF DESCRIPTION OF THE DRAWING

The above and other features of the invention will now be described in greater detail with reference to the accompanying drawing in which:

FIG. 1 is a front view of a framework according to the invention, showing a portion of a connecting part with attached plate and bar element, and a curved metal guide piece connected to a wall of the bar element;

FIG. 1A is a view similar to FIG. 1, showing the guide piece provided with an elastic sleeve;

FIG. 1B is another view similar to FIG. 1, wherein the head of a cap screw insertable into the guide piece is shown provided with an elastic sleeve;

FIG. 2 is a cross section along line II—II of FIG. 1; and

FIG. 3 is the representation according to FIG. 1, rotated by 90° around the longitudinal axis.

SPECIFIC DESCRIPTION

Three-dimensional frameworks are formed with the connecting part 1, in this instance a casting and with the bar elements 2 shaped uniformly therewith. The purpose of this construction is to obtain a finished three-dimensional framework whereby it is not visible that it has been assembled from individual elements, said framework having the look of a unitarily welded structure. In the embodiment of FIG. 1 the connecting part 1 as well as the bar element 2 are of square section. The bar elements 2 are made of drawn steel pipe sections. A central threaded bore 3 is provided at the exposed end of the connecting piece 1. A plate 4 with a central bore 5 is attached to the end of the bar element 2. The plate 4 is shaped on its outside exactly as the connecting part 1 and the bar element 2. The plate 4 is welded to the bar element 2. On the plate 4 at the inside of the bar element 2 a tubular guiding piece 6 is attached, which is welded to the interior front side of the plate 4. The guiding piece 6 is a slightly bent round pipe. The clear inside diameter of the guiding piece 6 is only slightly larger than the outside diameter of a cap screw 7 insertable into the guiding piece 6. The guiding piece 6 has a smaller outer diameter than the clear width of the bar element 2. The guiding piece 6 is slightly curved so that it abuts in an opening for the passage of the screw 8 in the wall of the bar element 2. At this outlet, the guiding piece 6 is welded to the rim of the opening of the bar element 2. The inner space of the bar element 2 is thus totally sealed from the outside. To assemble the framework, the bar element is correctly positioned with regard to the corresponding connecting piece 1 and then the cap screw, preferably a screw with hexagonal recessed hole, is inserted in the correct position into the guiding piece 6 and introduced in the bore of the plate 4. With the aid of an impact screwdriver provided with a knuckle joint, which can also be inserted in the guiding piece 6 in the same way as the screw, the screw 6 can be tightened under high force. In order to prevent the screw 7 from falling out from the guiding piece 6 in case of overhead mounting, in the embodiment shown a spring cage 9 is provided on the inside of the guiding piece 6 ending at a distance corresponding to the length of the screw from the plate 4. When the screw 7 is inserted the spring brackets of the spring cage 9 are temporarily pressed outwards and then, after the passage of the screw head they press themselves against the frontal part of the screw head. By this, the screw is temporarily secured, but still actuatable by an impact screwdriver.

In FIG. 1A the steel guiding piece 6 of FIG. 1 is shown provided with an inner elastic sleeve 6a to absorb friction forces developed under pressure of the cap screw 7 threading into the guiding piece and thereby to ease the thread drive. Alternatively, or in combination with such a sleeve 6a, the head of the cap screw 7 can be provided with an elastic sleeve 7a whereby, upon insertion of the screw into the guiding piece 6, the rim of the sleeve 7a pressing against the inside wall of the guiding piece induces a friction fit which, while not impeding the screw-thread drive, is sufficient to guide the cap screw 7 therethrough and finally to hold it secure.

I claim:

1. A framework assembly comprising at least one tubular bar element having a plate closing an end thereof, and opening in a wall of said element spaced away from said plate and a curved tubular guide received in said bar element and permanently affixed thereto to define the passage between said opening and said plate, said plate being provided with a hole aligned with said passage smaller than said passage thereby defining a shoulder on said plate;

a cap screw traversing said hole and having a head received in said passage and dimensioned to be guided by said passage from said opening for insertion of said cap screw through said hole; and a further member threadedly engaging said cap screw externally of said plate and having an exterior flush with said plate whereby said bar element, said plate and said further member form a framework junction when said cap screw is threadedly received by said further member and said head is in engagement with said shoulder free from recesses and projections.

2. The assembly defined in claim 1 wherein said guide is welded to said wall around said opening.

3. The assembly defined in claim 1 wherein said guide has inner and outer round cross sections.

4. The assembly defined in claim 1 wherein the clear inside diameter of said guide is only slightly greater than the outside diameter of said head and said cap screw is of the polygonal socket-screw type.

5. The assembly defined in claim 1 wherein said guide is affixed to a rear surface of said plate and said plate is welded to said end of said bar element.

6. The assembly defined in claim 1 wherein the head of said cap screw is provided with an elastic sleeve pressing against the interior of said guide.

7. The assembly defined in claim 1 wherein said guide has an elastic sleeve extending inwardly into said bar element away from said plate for a distance corresponding substantially to the length of said screw.

8. The assembly defined in claim 1 wherein said guide is formed with a spring cage terminating at a distance from said plate equal substantially to the length of said screw.

* * * * *